United States Patent [19]

Bartos

[11] Patent Number: 4,892,128

[45] Date of Patent: Jan. 9, 1990

[54] VEHICLE WHEEL SEAL ASSEMBLY

[75] Inventor: Josef A. Bartos, Diamond Bar, Calif.

[73] Assignee: Tire Inflation Systems Corp., Willoughby, Ohio

[21] Appl. No.: 286,041

[22] Filed: Dec. 19, 1988

Related U.S. Application Data

[63] Continuation-in-part of Ser. No. 91,057, Aug. 28, 1987, abandoned.

[51] Int. Cl.[4] .............................................. B60C 23/00
[52] U.S. Cl. .................................... 152/417; 137/580; 277/27; 277/83; 277/173
[58] Field of Search .................... 152/415, 416, 417; 141/38; 277/3, 27, 83, 173, 174, 175; 301/105 R, 124 R

[56] References Cited

U.S. PATENT DOCUMENTS

| 2,685,906 | 10/1954 | Williams | 152/417 |
|---|---|---|---|
| 2,849,047 | 8/1958 | Lamont et al. | 152/417 |
| 2,908,241 | 10/1959 | Todd | 115/1 |
| 2,989,999 | 6/1961 | Holbrook et al. | 152/416 |
| 3,362,452 | 1/1968 | Harnish | 152/416 |
| 3,451,460 | 6/1969 | Sipin | 152/417 |
| 4,434,833 | 3/1984 | Swanson et al. | 152/417 |
| 4,696,334 | 9/1987 | le Chatelier et al. | 152/417 |
| 4,733,707 | 3/1988 | Goodell et al. | 152/417 |

Primary Examiner—David Simmons
Assistant Examiner—Gregory J. Wilber
Attorney, Agent, or Firm—Body, Vickers & Daniels

[57] ABSTRACT

A wheel seal assembly is provided for a vehicle having an onboard system for controlling the pressure of air in a tire of the vehicle. The wheel seal assembly comprises a first annular seal members coaxial with the vehicle axle housing and mounted thereon for axial displacement relative thereto and toward and away from a second annular seal member coaxial with the first seal member and supported on the corresponding wheel assembly of the vehicle which is mounted on the axle housing for rotation relative thereto. The annular seal members may be mounted on the axle housing directly through or integrally with the associated rotating or non-rotating wheel bearing race. The two seal members have annular planar sealing surfaces facially engaging one another and flow passageways therethrough to provide for the flow of air across the seal members during inflation and deflation of the corresponding vehicle tire. The first seal member is biased into continuous engagement with the second seal member, such bias being just sufficient to preclude the ingress of dirt or other foreign matter between the sealing surfaces, and the first seal member is air pressure biased against the second seal member during tire inflating and deflating operations so as to seal against the leakage of air between the sealing surfaces during inflating and deflating operations.

46 Claims, 6 Drawing Sheets

VEHICLE WHEEL SEAL ASSEMBLY

This is a continuation-in-part of my co-pending application Ser. No. 091,057 filed Aug. 28, 1987, now abandoned.

BACKGROUND OF THE INVENTION

This invention relates to the art of tire inflating and deflating systems for vehicles and, more particularly, to a wheel seal assembly for vehicles having an on-board tire inflating and deflating system.

It is of course well known to provide a vehicle with an on-board system and apparatus to enable the vehicle operator to inflate, deflate and/or check the pressure of the vehicle tires with the vehicle at rest or in motion. Such systems and apparatus include a source of air under pressure carried on the vehicle, appropriate valving and controls for the flow of air to and from the tires, and sealing arrangements between fixed parts of the vehicle and rotating parts of the vehicle wheel assemblies which are intended to provide for the delivery of air under pressure to or from the vehicle tires without leakage of air to atmosphere between the sealed surfaces of the fixed and rotating parts.

Sealing assemblies heretofore provided for the foregoing purpose in connection with on-board tire inflating and deflating systems have most often included annular seals of resilient elastomeric material radially interposed between and in constant sealing engagement with the fixed and rotating parts. The seal members are axially spaced apart relative to one another so as to define an annular chamber between the fixed and rotating parts across which air under pressure flows during inflating and deflating operations. Such a seal arrangement is shown in U.S. Pat. No. 4,434,833 to Swanson et al, for example. Among the disadvantages of radial sealing arrangements of the latter character is the fact that the seal members are subjected to constant and uneven wear and thus a relatively rapid deterioration in effectiveness. Uneven wear occurs in part as a result of eccentricity between the fixed and rotating parts, and also results from relative radial or lateral displacement between the fixed and rotating parts during operation of the vehicle. More particularly in this respect, such annular seal members are generally interposed between the fixed axle housing of the vehicle and the rotatable wheel hub portion of the vehicle wheel assembly which is concentric with the axle housing and supported thereon for rotation by bearing assemblies. Accordingly, it will be appreciated that manufacturing tolerances alone preclude obtaining absolutely perfect radial spacing between the fixed and rotating parts engaged by the seal members, thus lending to uneven wear thereof. Additionally, bearing wear in the wheel assembly progressively increases the amount of relative radial or lateral displacement between the fixed and rotating components, thus further promoting uneven wear of the seal components. Moreover, depending on the design of the system, such sealing members are sometimes subjected to constant air pressure from the system, and this promotes wear in general and further promotes and increases uneven seal wear. Yet another disadvantage results from the fact that the elastomeric seal material wears at different rates in connection with different ambient temperature conditions. Such uneven wear leads to leakage across the seal members requiring frequent replacement thereof and the latter results in undesirably high maintenance time requirements and thus down time with respect to use of the vehicle.

In an effort to overcome the foregoing and other disadvantages of such annular radially interposed seals, and to avoid constant wearing interengagement between seals interposed between fixed and rotating parts, I devised a sealing arrangement as shown in my co-pending application Ser. No. 819,716 filed Jan. 17, 1986, now U.S. Pat. No. 4,705,090 and entitled "Method and Apparatus for Controlling Air Pressure in Vehicle Tires" and which is assigned to the same assignee as the present application. That patent discloses a first annular seal member on a fixed vehicle part and which seal member is coaxial with and axially spaced from the vehicle wheel assembly which carries a second seal member rotatable therewith and axially facing the first seal member. The first seal member is normally maintained axially spaced from the second seal member and is axially displaced into engagement with the rotatable second sealing member only during tire inflating and deflating operations. The normally spaced relationship between the seal members minimizes seal wear and, additionally, opening of the sealing area to atmosphere following use of the system provides for the expulsion of air under pressure from the sealing area, whereby the sealing system is effectively self-cleaning.

The sealing arrangement disclosed in my aforementioned patent can serve effectively to reduce sealing component wear by having the sealing components in engagement with one another only during operation of the tire inflating and deflating system. However, such effectiveness requires frequent use of the system, and there is a strong potential for scoring of the sealing surfaces and thus a reduction in the sealing capability thereof and the promotion of wear of the sealing components as a result of long periods of non-use of the system. More particularly in this respect, when such periods of non-use are extensive, although the vehicle is being used, there is a likelihood that dirt and other foreign matter will enter the space between sealing components and thus be captured between the sealing surfaces when the system is next actuated. While opening of the sealing members following operation of the system provides the self-cleaning feature referred to above, such does not effectively avoid contamination of the sealing surfaces in the absence of frequent use of the system. Another disadvantage of my earlier arrangement resides in the fact that moisture can enter the open sealing space, such as during a fording operation of the vehicle, and closing of the seal members and actuation of the system thereafter to inflate the tires operates to blow the moisture into the tires. Furthermore, there is the potential for the displaceable seal member to stick in its normally open position, and/or to bounce axially upon being displaced to engage the second seal member, both of which possibilities are detrimental to efficient operation of the system.

SUMMARY OF THE INVENTION

In accordance with the present invention, an annular axially engaging wheel seal assembly is provided for a vehicle having an on-board tire inflating and deflating system and which seal assembly avoids or minimizes the aforementioned problems and others encountered in connection with seal assemblies and arrangements heretofore provided.

In accordance with the principal feature of the invention, the wheel seal assembly is adapted to seal the inflating and deflating system where an air flow passageway extends between a rotating wheel component and a non-rotating axle component, and includes a first seal associated with the non-rotating axle component and a second seal associated with the rotating wheel component. The first seal includes a non-rotating annular seal member mounted on the axle component in a plane transverse to the wheel axis, and the second seal includes a second annular seal member mounted on the wheel component for rotation therewith in a plane transverse to the axis. The first and second annular seal members are biased into an engaged position defining an annular interface therebetween, and air flow passageways extend through the seal members and across the interface.

More particularly in accordance with one embodiment of the present invention, a first annular seal member having a planar sealing face is mounted on a fixed portion of the vehicle coaxial with the axis about which the corresponding vehicle wheel assembly rotates, and this seal member is supported on the fixed portion of the vehicle for axial displacement toward and away from the wheel assembly. A second annular seal also having a planar sealing face is provided on the wheel assembly coaxial with the axis of rotation thereof and for rotation therewith. The sealing faces of the seals are in planes transverse to the axis of rotation, and the sealing face of the displaceable seal member is in constant planar facial engagement with the sealing face of the second seal. Preferably, the first seal member is supported on the fixed portion of the vehicle so as to have a floating relationship with respect to the wheel axis, thus to enable obtaining and maintaining the constant planar facial engagement between the sealing faces. The first and second seals include openings providing for air flow across the sealing faces thereof and which openings are respectively connected to a source of system air under pressure on the vehicle and to the corresponding vehicle tire. Further, the displaceable seal member is normally biased toward the second seal with a force which is just sufficient to maintain the sealing faces in planar engagement with one another during periods of non-operation of the system so as to preclude the ingress of dirt, moisture or the like between the sealing surfaces. When the tire inflating and deflating system is in operation, system air under pressure biases the sealing face of the first seal member against the sealing face of the second seal with sufficient additional force to preclude the escape of system air between the sealing faces during the flow of air through the openings thereacross.

It will be appreciated that while the sealing faces of the two seals are in constant engagement during non-operating periods of the inflating and deflating system, such engagement is with minimum biasing force as opposed to the magnitude of the force thereagainst by system air under pressure during operation of the system, whereby there is negligible wearing engagement between the faces of the seals when the system is not in operation. It will be further appreciated, with regard to the engagement of the sealing faces of the two seals in planes transverse to the wheel axis, that the floating capability of the first seal member and the biasing thereof toward the second seal provide for the planar sealing faces of the two seals to remain in constant planar engagement with one another so as to accommodate radial and/or pivotal displacements of the wheel assembly and thus the second seal relative to the axis of rotation and the first seal member. Such displacements include those resulting from manufacturing tolerances, bearing wear and/or eccentricity of the wheel assembly relative to the axis of the vehicle axle on which it is rotatably mounted. By obtaining and maintaining such constant planar engagement between the sealing faces, minimal and uniform wear of the faces is achieved as well as optimum sealing against the escape of system air therebetween during operation of the system.

In accordance with another embodiment of the invention, the second annular seal may be formed integrally with the rotating outer race member of the wheel bearing assembly. This simplifies the construction of the wheel and wheel seal assemblies, reduces the cost thereof, and facilitates maintenance and/or replacement of the seal assembly. The second annular sealing face may be provided by a replaceable annular wear pad mounted on or recessed into the second annular seal, and having openings corresponding to and aligned with the air and lubricant openings therein. Frictional wearing of the rotating outer bearing race member would thereby be reduced and, moreover, the sealing surface would be readily replaceable in the event of damage or excessive wear.

In accordance with another feature of this embodiment, the wheel seal assembly may include a lubricant flow passageway extending through one of the annular seals communicating with lubricant provided at the wheel bearing assembly between the rotating and non-rotating elements of the vehicle so the axle lubricating system provides lubricant to the wheel seal assembly.

In accordance with yet another embodiment of the invention, the first and second annular seals are respectively supported on the non-rotating and rotating race members of the wheel bearing assembly. Similar to the previously described embodiment, this embodiment further simplifies the construction of the wheel and the wheel seal assemblies, reduces the cost thereof, and facilitates maintenance and/or replacement of the seal assembly. Alternatively, as an adaptation of this embodiment, only one of the first and second annular seals and the corresponding non-rotating or rotating race member is so formed.

It is accordingly an outstanding object of the present invention to provide an improved wheel seal assembly for use with a vehicle having an on-board system for controlling the pressure of air in the vehicle tires.

Another object is the provision of a wheel seal assembly of the foregoing character which promotes uniform and minimal wear of the seal members.

Another object is the provision of a seal assembly of the foregoing character which requires a minimum amount of structural adaptation to standard axle components.

Still another object is the provision of a seal assembly of the foregoing character comprised of rotating and non-rotating annular seals coaxial with the vehicle wheel axis and having sealing faces in engagement and across which system air under pressure flows during operation of the system.

Still another object is the provision of a seal assembly of the foregoing character comprised of rotating and non-rotating annular seals coaxial with the vehicle wheel axis and having planar sealing faces in engagement in planes transverse to the axis and across which system air under pressure flows during operation of the system.

Yet another object is the provision of a sealing assembly of the foregoing character in which one of the seals has a floating relationship with the other so as to obtain and maintain planar facial interengagement between the sealing faces in response to relative displacements therebetween.

A further object is the provision of a seal assembly of the foregoing character in which the sealing faces of the seals are normally biased in facial engagement to seal against the ingress of foreign matter therebetween during periods of non-use and in which system air under pressure increases such bias during use of the system, thus to seal against the leakage of air to atmosphere between the sealing faces during use.

Another object is the provision of a wheel seal assembly of the foregoing character in which the rotating annular seal is Provided on the outer race member of the wheel bearing assembly.

An additional object is the provision of a wheel seal assembly of the foregoing character in which the rotating and non-rotating annular seals are respectively on the outer and inner race members of the wheel bearing assembly.

Still a further object is the provision of a wheel seal assembly of the foregoing character which is economical to construct, efficient in operation, and which is readily adaptable for mounting on existing vehicle axle and wheel assemblies.

BRIEF DESCRIPTION OF THE DRAWINGS

The foregoing objects, and others, will in part be obvious and in part pointed out in greater detail hereinafter in connection with the description of preferred embodiments of the invention illustrated in the accompanying drawings in which.

DESCRIPTION OF THE PREFERRED EMBODIMENTS

Figure 1:
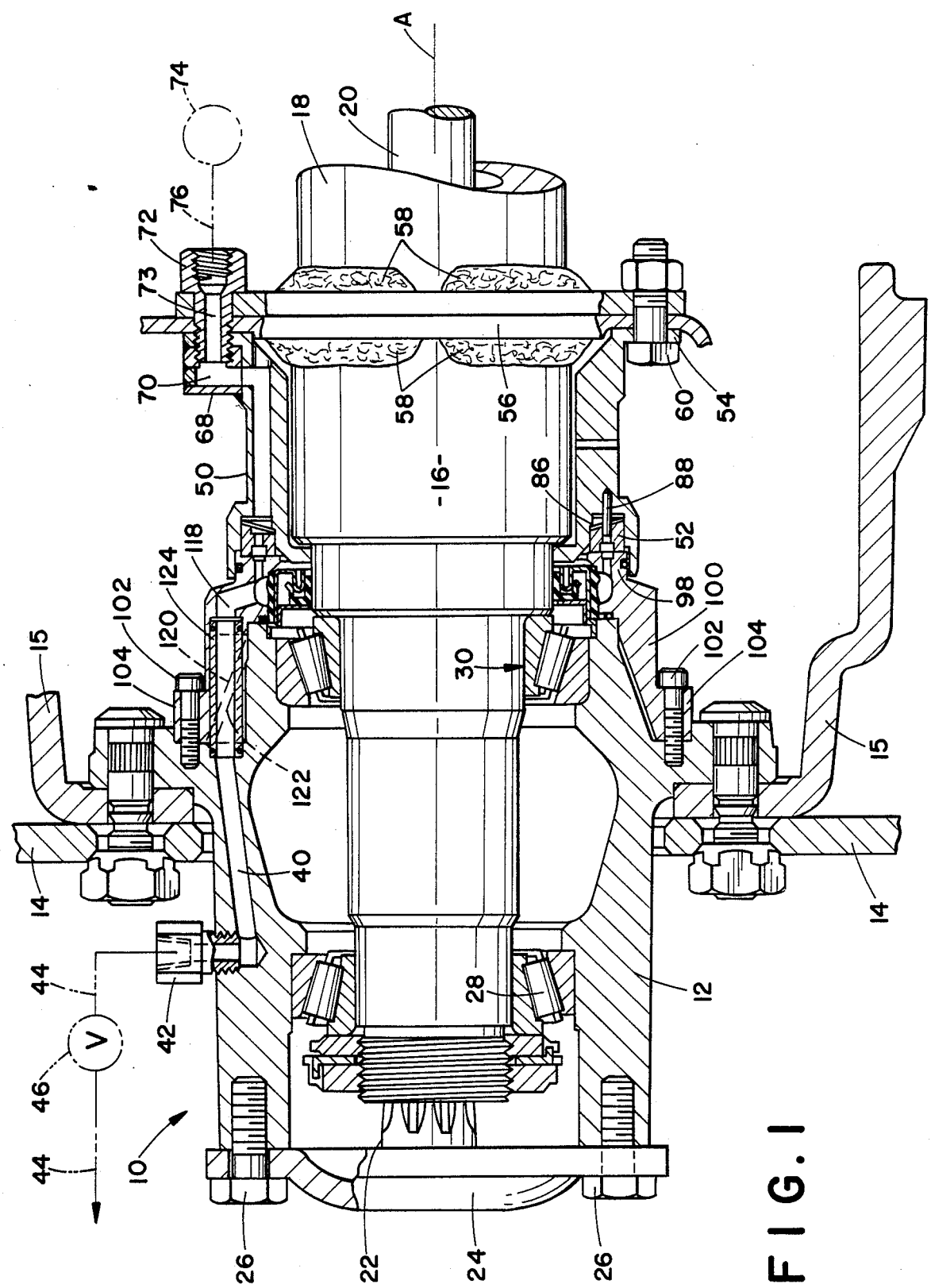
FIG. 1 is a sectional elevation view of a wheel seal assembly in accordance with one embodiment of the present invention mounted on the axle housing and wheel assembly of a vehicle.

Referring now in greater detail to the drawings wherein the showings are for the purpose of illustrating preferred embodiments of the invention only and not for the purpose of limiting the invention, in FIGS. 1-4 there is illustrated one embodiment comprising wheel assembly 10 including a hub component 12 on which are mounted a rim 14 and brake drum assembly 15, both of which are only partially shown. In a well known manner, the rim component 14 carries a pneumatic tire which is not shown. The wheel assembly is rotatably mounted on a tubular axle housing 16 having an axis A and an axially inner portion 18 secured to the vehicle chassis, not shown, such that the axle housing is a non-rotatable component. As is well known, a drive shaft 20 extends through the axle housing coaxial with axis A and has an axially splined outer end 22 interengaged with a drive cap member 24 secured to hub component 12 such as by bolts 26. Accordingly, it will be appreciated that rotation of drive shaft 20 about axis A imparts rotation to wheel assembly 10 about the latter axis. In the embodiment shown, end 22 is welded to cap 24, and drive shaft 20 has an axially separable coupling arrangement between the inner and outer ends thereof, not shown, which enables removal of cap 24 and drive shaft end 22 from hub 12 to facilitate removal and replacement of wheel assembly 10 relative to axle housing 16.

Hub component 12, in a conventional manner, is rotatably supported on axle housing 16 by means of roller bearing assemblies 28 and 30 which are protected from the ingress of dirt, moisture and the like by an annular sealing unit 32 comprising a generally U-shaped seal member 34 mounted on axle housing 16 and the legs of which sealingly interengage with a U-shaped portion 36 of a sealing member 38 supported on hub component 12 for rotation therewith about axis A. Hub component 12 is provided with an axially extending bore 40 having an axially outer end in flow communication with a coupling component 42 which is adapted to be connected in flow communication with the corresponding vehicle tire through a flow line 44 and, preferably, a tire isolating valve 46 as schematically represent in FIG. 1. As will become apparent hereinafter, bore 40, coupling 42, flow line 44, and valve 46 accommodate the flow of air under pressure to and from the vehicle tire in connection with operation of the tire pressure control system on-board the vehicle.

In accordance with the present invention, axle housing 16 and hub 12 of wheel assembly 10 support the component parts of a wheel seal assembly 48 by which air under pressure is transmitted between the fixed and rotating parts of the vehicle during operation of the tire pressure control system. More particularly in this respect, axle housing 16 receives an annular mounting sleeve 50 which supports a first sealing member 52 and which sleeve is secured to axle housing 16 coaxial with axis A. More particularly in this respect, sleeve 50 includes a radially outwardly extending peripheral mounting flange 54 which abuts against a mounting plate 56 secured to axle housing 16 such as by weldments 58, and sleeve 50 is secured in place against the mounting plate by means of a plurality of nut and bolt assemblies 60 extending through flange 54 and the mounting plate as will be appreciated from the showing of one such nut and bolt assembly in FIG. 1. The axially outer end of sleeve 50 is provided with an annular chamber 64 coaxial with axis A and opening axially outwardly toward wheel assembly 10, and an axially extending bore 66 is provided in sleeve 50 and has an axially outer end opening into the axially inner end of chamber 64. Sleeve 50 is provided with an enlargement 68 at the upper end of mounting flange 54 to accommodate the provision of a radially extending bore 70 communicating with the axially inner end of bore 66, and a tubular coupling 72 extends through mounting plate 56 and into enlargement 68 to provide a bore 73 in communication with the radially outer end of bore 70. Coupling 72 is connected to a source 74 of air under pressure on the vehicle by means of a an appropriate flow line 76, as schematically shown in FIG. 1.

First seal member 52 is coaxial with axis A and is supported in chamber 64 for axial displacement relative thereto and thus toward and away from wheel assembly 10. Preferably, seal member 52 is constructed of carbon graphite and has a sealing face defined by radially extending, annular co-planar sealing surfaces 78 radially separated by an annular recess or channel 80 extending axially inwardly of surfaces 78. A plurality of openings 82 extend through seal member 52 from the bottom of recess 80 and thus have axially inner ends which open into chamber 64 behind the seal member. A thin metal, annular spring washer 84 is provided in the portion of chamber 64 behind seal member 52 and serves to provide a slight biasing force against seal member 52 for the purpose set forth hereinafter. Spring washer 84 is provided with a plurality of openings 86 therethrough preferably corresponding in number to and aligned with openings 82 in the seal member, and the spring washer and seal member 52 are restrained against rotation about axis A such as by a pair of pins 88. Pins 88 are fixed in corresponding bores therefore in sleeve 50, not designated numerically, and extend through aligned openings 86 and into openings 82. It will be appreciated of course that the diameters of pins 88 are sufficiently smaller than the diameters of openings 82 in seal member 52 to provide for axial displacement of the seal member relative to the pins.

The axially extending outer and inner side walls of seal member 52 are provided with annular grooves 90 and 92, respectively, and these grooves respectively receive O-ring seals 94 and 96 which sealingly engage with the corresponding one of the axially extending outer and inner side walls of chamber 64. An appropriate clearance, for example 0.015 inch, is provided between the inner and outer side walls of seal member 52 and the inner and outer side walls of chamber 64 to provide for seal member 52 to have a floating relationship relative to axis A for the purpose which will become apparent hereinafter. From the foregoing description, it will be appreciated that air under pressure from source 74 is adapted to flow through bores 73, 70 and 66 into chamber 64 and thence through openings 86 in spring 84 and openings 82 in seal member 52 into channel 80 of the seal member, and that O-ring seals 94 and 96 seal against the flow of air across the outer and inner surfaces of the seal member.

Further in accordance with this embodiment, seal assembly 48 includes a second annular seal member 98 coaxial with axis A and mounted on rotatable wheel assembly 10 for rotation therewith. More particularly in this respect, seal member 98 is integral with an annular mounting sleeve 100 coaxial with axis A and mounted on the axially inner portion of hub component 12 such as by means of a plurality of threaded fasteners 102 extending through openings therefor in mounting flange portion 104 of the sleeve and thence into corresponding openings provided therefor in hub component 12. Preferably, second seal member 98 is constructed of carbonized steel and includes a hardened sealing face defined by radially extending, annular co-planar sealing surfaces 106 radially spaced apart by an annular recess or channel 108 opening axially inwardly toward channel 80 of seal member 52. An annular recess 110 is provided in sleeve 100 behind sealing member 98, and the latter is provided with a plurality of openings 112 opening between the bottom of channel 108 and recess 110. Recess 110 surrounds sealing member 38 of seal unit 32, and seal member 38 is provided about the outer periphery thereof with an annular sealing sleeve 114 which sealingly engages against radially inner portions of sleeve 100 on axially opposite sides of recess 110 to seal the latter against the flow of system air into the hub and axle housing areas. Additionally, an O-ring seal 116 is disposed in a groove therefor in sleeve 100 to further assure against leakage between sleeve 100 and the abutting end of hub 12.

Sleeve 100 is provided with a port 118 extending radially outwardly from recess 110 and then axially toward bore 40 in hub component 12. Because of the tapered contours of the axially overlapping portions of sleeve 100 and hub component 12, it will be appreciated that end 120 of bore 118 opening through sleeve 100 and end 122 of bore 40 opening through hub component 12 are tapered, whereby a nipple component 124 is employed to sealingly connect port 118 and bore 40 in flow communication with one another. Seal member 98 is provided with a radially outwardly open circumferential groove 126, and support sleeve 50 for seal member 52 is provided with an annular skirt portion 128 extending axially outwardly beyond chamber 64 so as to overlie groove 126. An annular graphite sealing ring 130 is received in groove 126 to engage against the inner surface of skirt 128 and thus provide a seal against the ingress of dirt and the like to the area of the sealing surfaces of the sealing members adjacent the radially outer peripheries thereof. It will be appreciated that seal unit 32 and sealing member 114 provide such protection with respect to the ingress of dirt and the like to the area between the sealing surfaces adjacent the inner peripheries of the sealing members.

When the tire pressure control system is to be operated, appropriate controls on the vehicle are actuated for air from source 74 to flow through line 76 to coupling 72 and thence through ports 73, 70 and 66 into chamber 64. The air then flows through openings 86 in spring 84 and openings 82 through seal member 52 and, since the area of the inner end of sealing member 52 is larger than the area of openings 82, the air under pressure in chamber 64 behind seal member 52 biases seal member 52 toward seal member 98. This provides for the sealing surfaces 78 and 106 to sealingly interengage so as to preclude the escape of system air under pressure therebetween. System air flowing through openings 82 enters channel 80 and channel 108 and then flows through openings 112 in seal member 98 and into recess 110. From recess 110 the air under pressure flows through passageway 118 and nipple 124 to bore 40, coupling 42 and line 44 to tire isolating valve 46. Assuming valve 46 to be of the pneumatically actuated type, air under pressure in line 44 opens the valve and the valve remains open during the ensuing flow of air to the tire to achieve inflation thereof, or the flow of air from the tire back through the system toward source 74 to achieve deflation of the tire. It will be appreciated, of course, that valve 46 could be otherwise controlled, such as electronically, to open at the beginning of an inflating or deflating cycle and to close following such inflating or deflating operation. In connection with deflation of the tire, the air pressure control system includes a deflate valve, not shown, which opens to provide a controlled flow of air from the tire toward source 74 and to atmosphere. While it is not critical in connection with deflation to maintain a tight seal between seal members 52 and 98, since the excess air in the tire is being exhausted to atmosphere, there is nevertheless a back pressure in chamber 64 during deflation which biases seal member 52 toward seal member 98 to maintain the sealed engagement therebetween. In any event, following an inflating or deflating operation, valve 46 is closed to isolate the corresponding tire from the system, and air under pressure in the system between valve 46 and source 74 is suitably vented to atmosphere, thus removing the air pressure bias against the inner end of sealing member 52 so that the latter is once again only slightly biased against sealing member 98 by spring 84.

It will be appreciated from the foregoing description that the axially opposed sealing members 52 and 98 and thus the axially opposed sealing surfaces 78 and 106 thereof are coaxial with axis A and that sealing surfaces 106 rotatably engage sealing surfaces 78 when wheel assembly 10 is rotated about axis A. It will be further appreciated that the floating relationship between sealing member 52 and chamber 64 together with spring 84 maintain sealing surfaces 78 in co-planar facial engagement with sealing surfaces 106 in response to any displacement of sealing member 98 which would tend to displace the plane of sealing surfaces 106 axially, radially and/or pivotally relative to axis A. Accordingly, the sealing members and thus the sealing faces are maintained in accurate alignment with one another, whereby minimal and uniform wearing engagement is achieved during periods of operation of the vehicle without operation of the tire pressure control system, and whereby appropriate alignment and co-planar engagement of the sealing surfaces is assured when operation of the air pressure control system is initiated. Further, such co-planar engagement and alignment provides for the flow of air under pressure across the sealing surfaces during operation of the system to be achieved without leakage between the sealing surfaces and assures maintaining the desired uniform wearing engagement between the sealing surfaces when air under pressure in the system in chamber 64 behind sealing member 52 increases the force of engagement between the sealing surfaces of the two sealing members.

Figure 5:
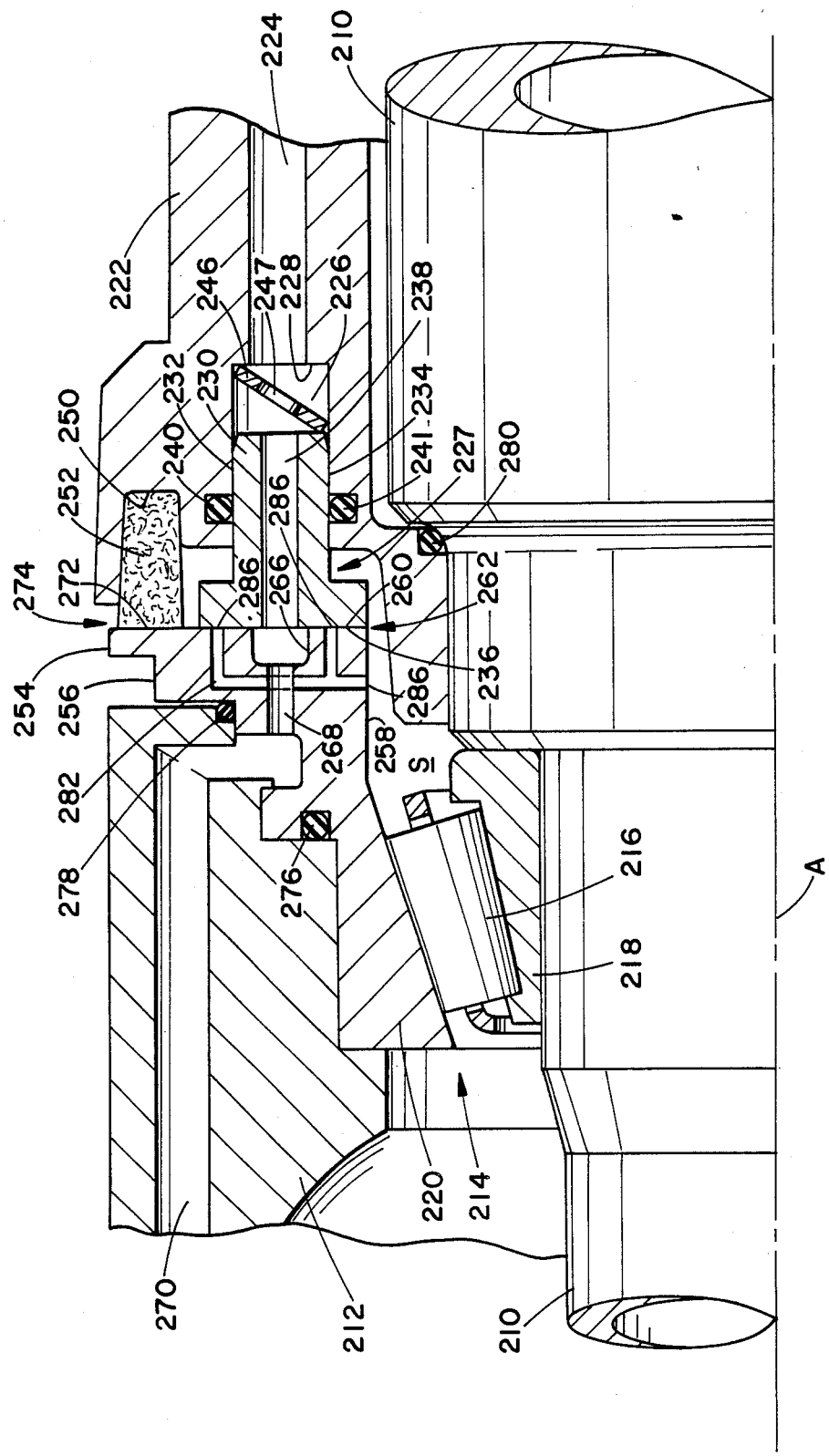
FIG. 5 is a cross-sectional view of a portion of a wheel seal assembly in accordance with another embodiment of the invention.

In FIG. 5 there is shown another embodiment of the present invention. Similarly to the above described embodiment, in FIG. 5 there is shown a rotating hub component 212 which is mounted for rotation about the non-rotating tubular axle housing 210 by means of a roller bearing assembly 214. The roller bearing assembly 214 comprises roller bearings 216 held between a non-rotating race member 218 fixed to the non-rotating tubular axle housing 210, and a rotating race member 220 fixed to the rotating hub component 212.

A non-rotating annular mounting sleeve 222 is fixed to the axially inner end of the non-rotating tubular axle housing 210, and includes an axially extending bore 224 communicating at an inner end thereof with a source of air under pressure. The annular mounting sleeve 222 includes an annular chamber 226 having an open outer end 227 and an inner end 228 communicating with the bore 224. A first annular sealing member 230 is received in the annular chamber 226 in a manner to be axially displaceable therein, and includes a radially outer surface 232, a radially inner surface 234, and a first annular sealing surface 236 in a plane transverse to axis A. A plurality of axially extending openings 8 extend through the first annular sealing member 230 to communicate the first annular sealing surface 236 with the annular chamber 226 in the annular mounting sleeve 222. O-ring seals 240 and 241 block air flow axially across the radially outer surface 232 and the radially inner surface 34 of the first annular sealing member 230. A spring washer 246, having air holes 247, is disposed within the annular chamber 226 in a manner to exert an axial force against the first annular sealing member 230. The annular mounting sleeve 222 includes a radially outer surface 250 to which is mounted a dust seal 252 such as an annular fibrous wiper ring. While not shown, it will be appreciated that sleeve 222 bas openings therein for pins similar to pins 88 in the embodiment of FIGS. 1–4 to restrain rotation of spring 246 and seal member 230.

A second annular sealing member 254 is formed integrally with the rotating race member 220 to rotate therewith. The second annular sealing member 254 includes a radially outer surface 256, a radially inner surface 258, and a second annular sealing surface 260. The second annular sealing surface 260 is in facial engagement with the first annular sealing surface 236, as the first annular sealing member 230 is axially biased against the second annular sealing member 254 by means of the spring washer 246. There is thus defined an interface 262 between the first and second annular sealing members 230 and 254 similarly to the arrangement described above regarding the embodiment shown in FIGS. 1–4.

The second annular sealing member 254 includes an annular recess 266 in the second annular sealing surface 260, and an opening 268 extending axially to a rearward position in communication with a bore 270 in the rotating hub component 212. The bore 270 communicates with the vehicle tire carried on the rotating hub component 212. The first and second annular sealing members 230 and 254 cooperate to function in accordance with the principal feature of the invention as do the first and second seal members 52 and 98 described with reference to the first described embodiment.

The second annular sealing member 254 also includes a radially outer surface region 272 against which the dust seal 252 presses in firm contact in order to provide a dust barrier across the gap 274 between the annular mounting flange 222 and the second annular sealing member 254.

A space S is defined between the roller bearing assembly 214 and the radially inner surface 258 of the second annular sealing member 254. The space S contains a lubricant associated with the roller bearing assembly 214, and is sealed from the exterior of the wheel seal assembly by means of O-ring seals 276, 278, and 280 in conjunction with the dust seal 252 and the O-ring seals 240 and 241.

In accordance with a particular feature of the invention as shown in FIG. 5, lubricant flow passageways 282 are provided to communicate the interface 262 between the first and second annular sealing members 230 and 254 with a source of lubricant. Preferably, the lubricant flow passageways 282 open on the second annular sealing surface 260 and the radially inner surface 258 at one or more orifices 286. The lubricant flow passageways 282 thereby communicate the interface 262 with lubricant contained in the space S and are preferably sized to permit deposition of only a thin film of lubricant at the interface 262.

Figure 6:
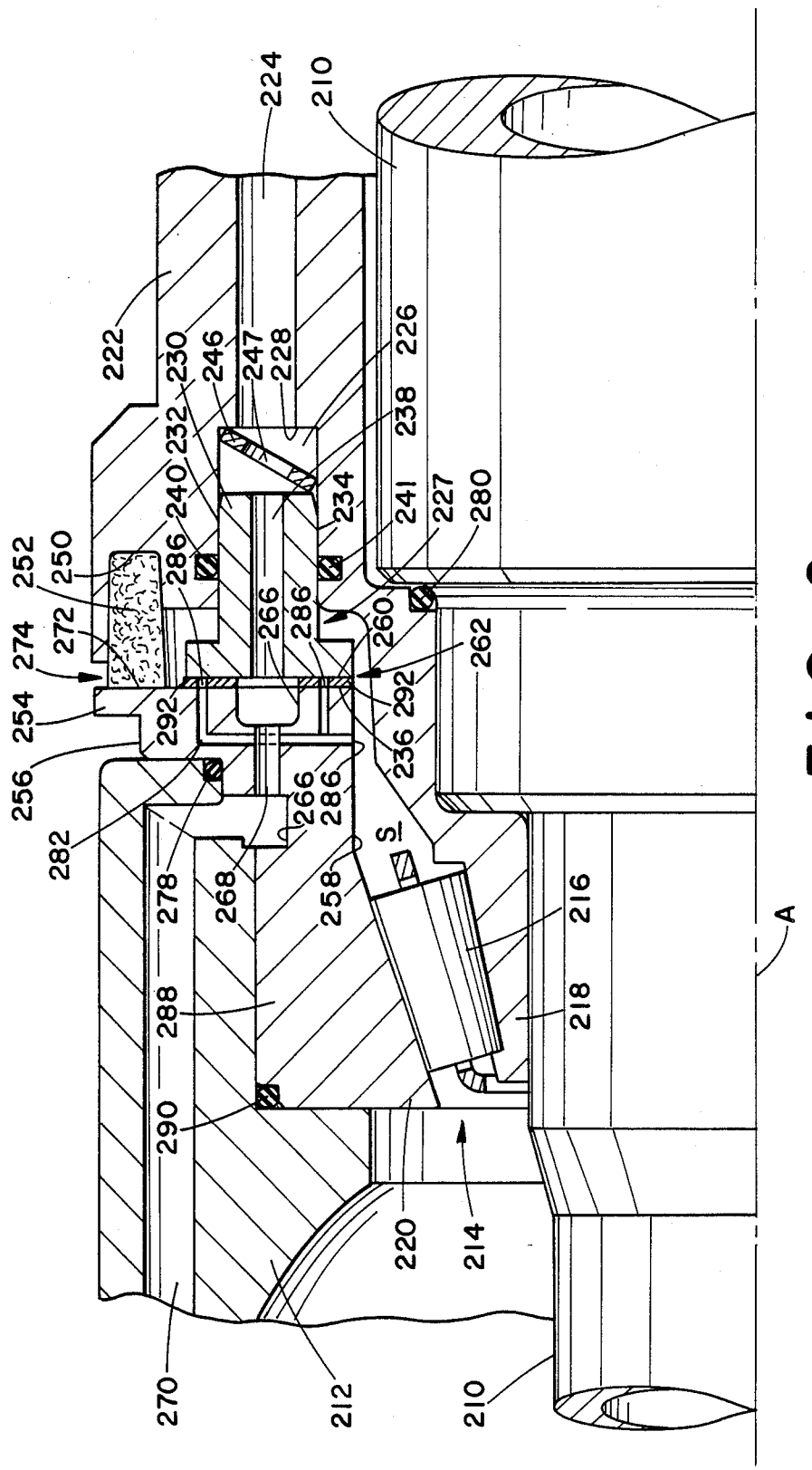
FIG. 6 is a cross-sectional view of a portion of a wheel seal assembly in accordance with yet another embodiment of the invention.

In accordance with yet another embodiment of the invention, as shown in FIG. 6, the integrally formed second annular sealing member 254 and the rotating race member 220 as shown in FIG. 5 are jointly provided by a single annular member 288 similarly fixed to the rotating hub component 212 and defining a space S adjacent the roller bearing assembly 214 and sealed as by provision of an O-ring seal 290. The single annular component 288 comprises the structural features associated with the second annular sealing member 254 and the rotating race member 220 as those members are described above with reference to FIG. 5. Further in accordance with this embodiment of the invention, the non-rotating race member 218 and the non-rotating annular mounting sleeve 222 are similarly formed integrally.

In accordance with another feature of the invention, annular wear pads 292 are releasably mounted on or recessed into the second annular sealing member 254 for rotation therewith. The wear pads 292 provide the second annular sealing surface 260, and have lubricant openings corresponding to orifices 286 in the second annular sealing member 254. Use of the wear pads 292 promotes the useful life of the single annular component 288 by reducing wear in the bearing assembly caused by means of friction not associated with the roller bearings 216.

Figure 2:
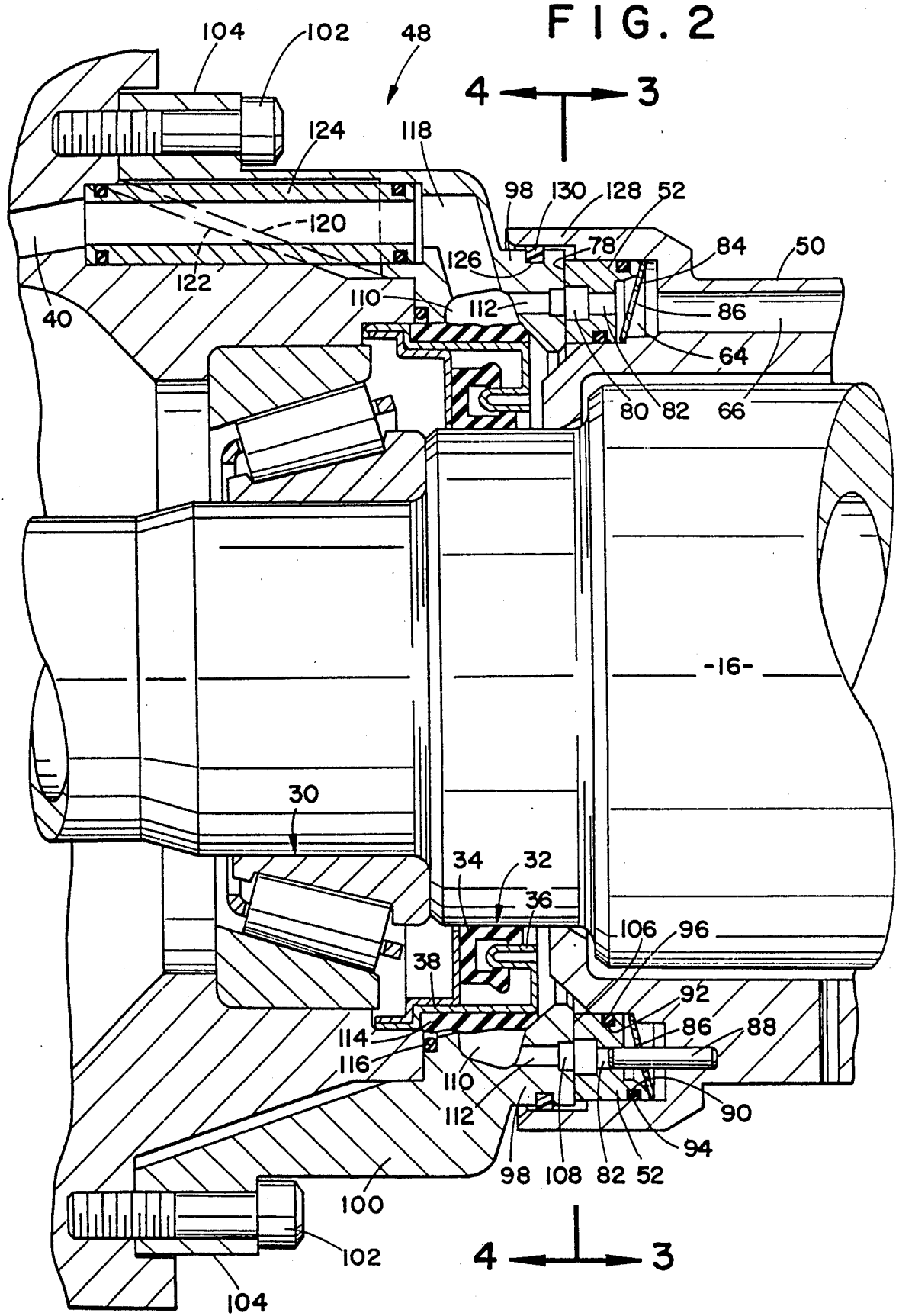
FIG. 2 is an enlarged cross-sectional view of a portion of the seal assembly shown in FIG. 1.
Figure 3:
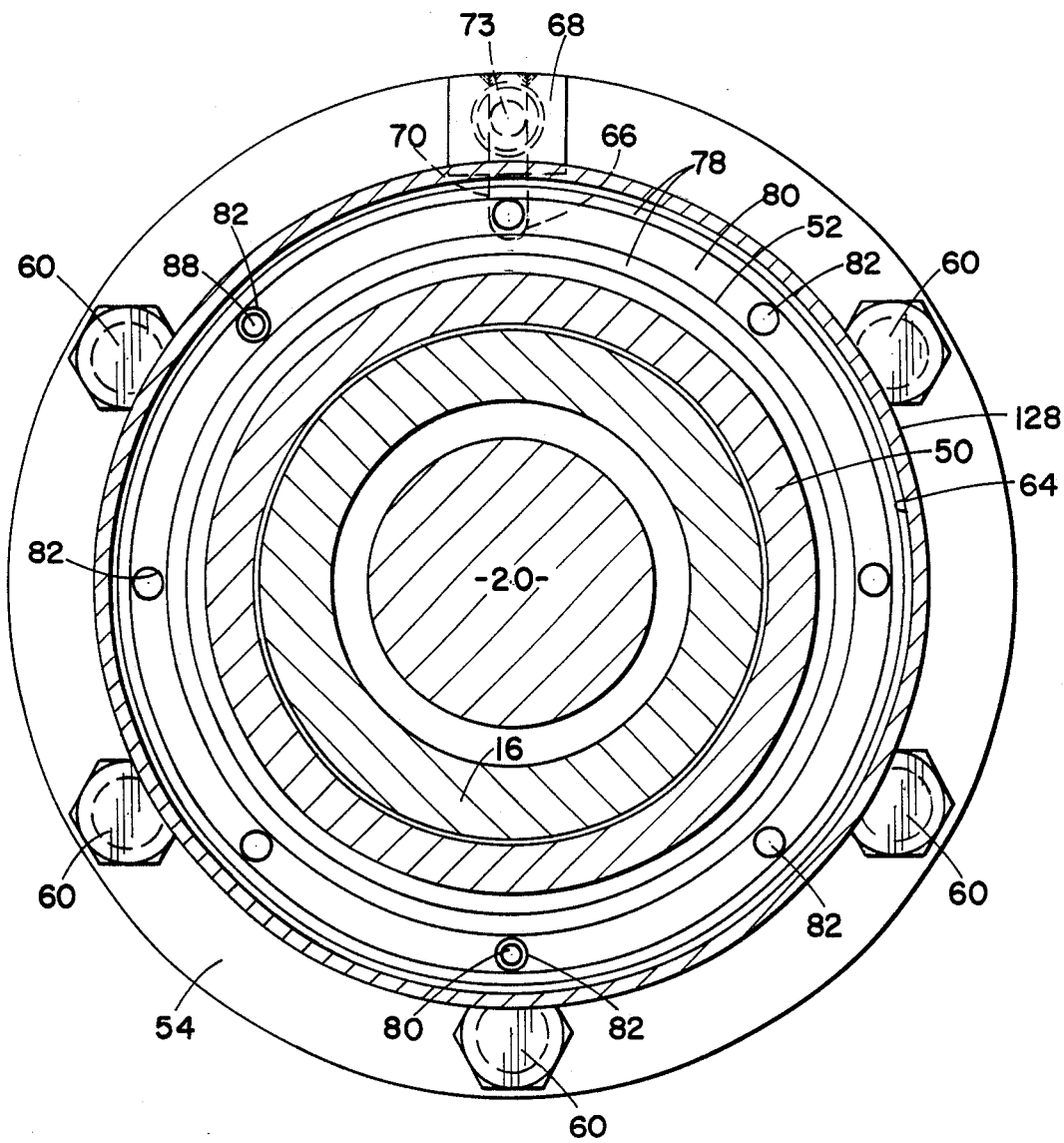
FIG. 3 is a cross-sectional elevation view taken along line 3—3 in FIG. 2.
Figure 4:
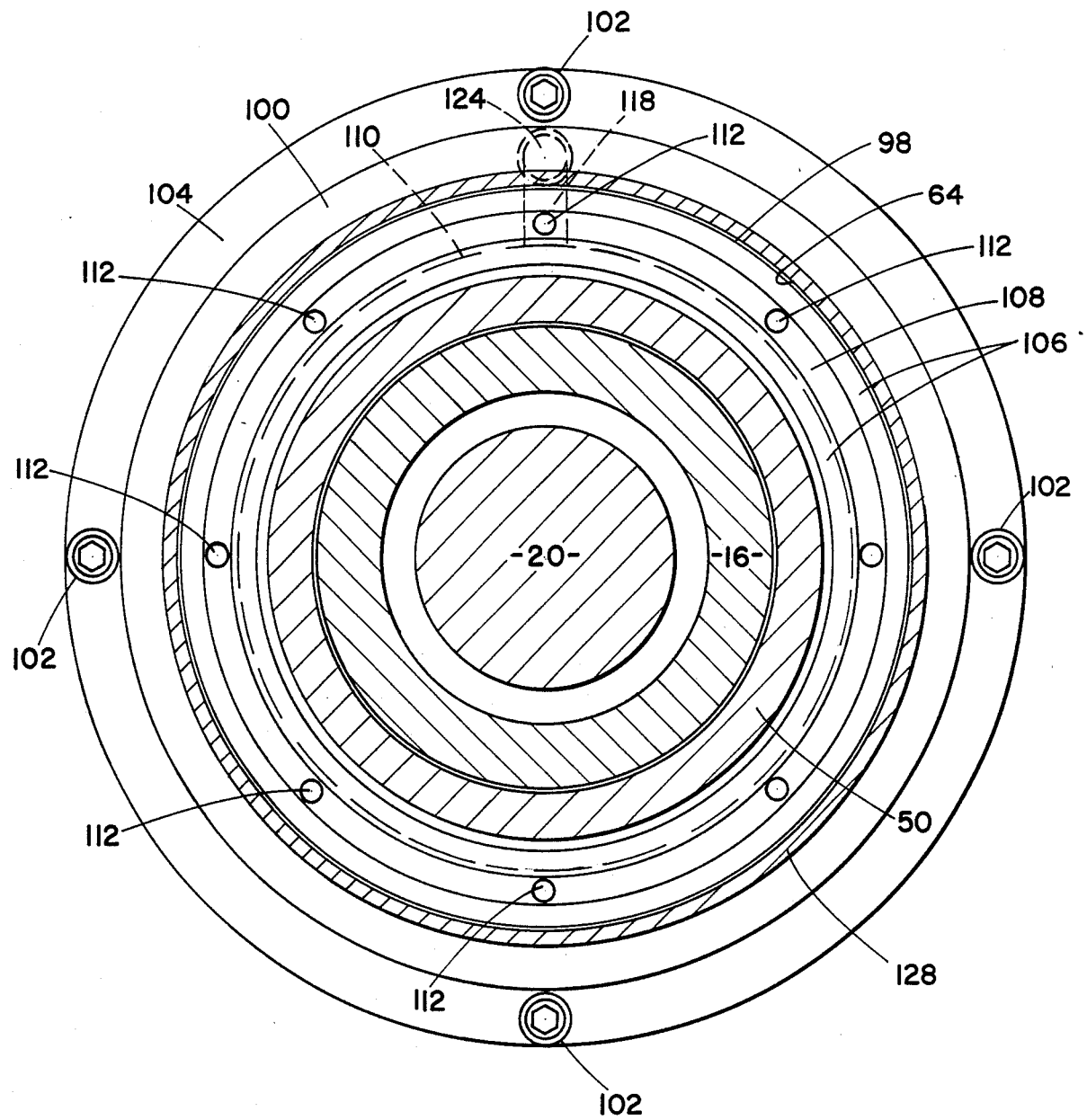
FIG. 4 is a cross-sectional elevation view taken along line 4—4 in FIG. 2.

It will be appreciated from the foregoing description of FIGS. 1-6 that another possible arrangement using the bearing races would be to support the first annular seal member 230 on an integral extension of bearing race 218 as shown in FIG. 6 and to provide the second annular sealing member in a form similar to sleeve 100 as shown in FIG. 2.

While considerable emphasis has been placed herein on the specific structure and structural interrelationship between the component parts of the preferred embodiment illustrated in the drawings, it will be appreciated that other embodiments of the invention can be made and that modifications can be made in the preferred embodiment without departing from the principles of the present invention. In this respect, for example, it will be appreciated that the structures of seal member supporting sleeves can vary from those shown in the drawings and will vary depending on the structure of a particular vehicle axle housing and wheel assembly with which the sealing assembly is associated. The use of sleeves such as sleeves 50 and 100 and the use of bearing race members to support the seal members advantageously facilitates retrofitting an existing vehicle with a seal arrangement according to the invention. However, the use of such sleeves may not be necessary in connection with providing the seal arrangement in connection with original equipment manufacture. Further in this respect, and in connection with the first embodiment illustrated for example, it would be possible in connection with the manufacturing of wheel hub component 12 to modify the tapered axially inner portion of the wheel hub so that the latter would have a planar end surface transverse to axis A which could provide or have mounted thereon a component to provide the seal face defined by sealing surfaces 106. With regard to other possible modifications, it will be appreciated that annular spring washers 84 and 246 could be replaced by a number of coil springs spaced apart circumferentially in chamber 64, the spring washer being preferred because it is easier to structurally associate with the chamber and seal members, and because it provides a more uniform application of and thus better control of the biasing force against sealing member 52 about the periphery thereof. The foregoing and other modifications will be obvious or suggested to those skilled in the art upon reading the foregoing description of the embodiments illustrated, whereby it is to be distinctly understood that the foregoing descriptive matter is to be interpreted merely as illustrative of the invention and not as a limitation.

Having thus described the invention it is claimed:

1. A wheel seal assembly for a vehicle having an onboard system for controlling the pressure of air in a tire of the vehicle, said system including a source of air under pressure, said vehicle having wheel means carrying said tire, wheel support means having an axis, and means supporting said wheel means on said wheel support means for rotation about said axis, said seal assembly comprising first annular seal means surrounding said wheel support means and coaxial therewith, means supporting said first annular seal means on said wheel support means for reciprocating movement axially thereof and against rotation relative to said axis, said first annular seal means having first annular sealing surface means in a plane transverse to said axis, second annular seal means coaxial with said axis, means supporting said second annular seal means for rotation with said wheel means, said second annular seal means having second annular sealing surface means in a plane transverse to said axis and facially engaging said first annular sealing surface means, means biasing said first annular seal means toward said second annular seal means to maintain said facial engagement, said first and second annular seal means respectively having first and second air flow passageway means opening axially through the corresponding sealing surface means to provide for flow across said facially engaging first and second annular sealing surface means, means for connecting said first air flow passageway means to said source of air under pressure, and means for connecting said second air flow passageway means with said tire.

2. A wheel assembly according to claim 1, wherein said means biasing said first seal means toward said second seal means includes biasing spring means.

3. A wheel seal assembly according to claim 1, wherein said means supporting said first seal means includes annular chamber means axially slidably receiving said first seal means, said means for connecting said first air flow pas-. sageway means to said source including air inlet means opening into said chamber means behind said first seal means with respect to said first sealing surface means, and said first air flow passageway means opening through said first seal means into said chamber means.

4. A wheel seal assembly according to claim 3, wherein said annular chamber means supports said first seal means for tilting displacement relative to said axis, whereby said first seal means is displaceable relative to said axis to maintain said first and second sealing surface means in coplanar facial engagement.

5. A wheel seal assembly according to claim 4, wherein said means biasing said first seal means toward said second seal means includes spring means in said chamber means behind said first seal means.

6. A wheel seal assembly according to claim 3, wherein said first and second seal means include annular recesses i the corresponding sealing surface means, said first and second air flow passageway means opening into the corresponding one of said annular recesses.

7. A wheel seal assembly according to claim 6, wherein said annular chamber means supports said first seal means for tilting displacement relative to said axis, whereby said first seal means is displaceable relative to said axis to maintain said first and second sealing surface means in coplanar facial engagement.

8. A wheel seal assembly according to claim 7, wherein said means biasing said first seal means toward said second seal means including spring means in said chamber means behind said first seal means.

9. A wheel seal assembly according to claim 8, wherein said spring means is an apertured annular sheet metal spring washer.

10. A wheel seal assembly according to claim 9, wherein said first and second air flow passageway means include a plurality of bores in each said first and second seal means, circumferentially spaced apart in the corresponding one of said annular recesses in said first and second sealing surface means.

11. A wheel seal assembly for a vehicle having an onboard system for controlling the pressure of air in a tire of the vehicle, said system including a source of air under pressure, said vehicle having wheel means carrying said tire, wheel support means having an axis, means supporting said wheel means on said wheel support means for rotation about said axis, said wheel support means having an axially outer end, and said wheel means being mounted on said wheel support means for axially outward removal therefrom and having an axially inner end, said wheel seal assembly comprising first annular sleeve means surrounding and coaxial with said wheel support means, said first annular sleeve means being removably mounted on said wheel support means axially inwardly of said inner end of said wheel means and having an axially outer end facing said inner end of said wheel means, annular seal member means, annular chamber means in said outer end of said first sleeve means, means including said chamber means supporting said annular seal member means for axial reciprocation relative to said annular chamber means and against rotation relative to said axis, said seal member means having an axially outer end including first annular planar sealing surface means in a plane transverse to said axis, second annular sleeve means coaxial with said axis and removably mounted on said inner end of said wheel means for rotation therewith, said second annular sleeve means having an axially inner end including second annular planar sealing surface means in a plane transverse to said axis and facially engaging said first annular sealing surface means, means biasing said annular seal member means toward said inner end of said second annular sleeve means to maintain said facial engagement, said annular seal member means and said second annular sleeve means respectively having first and second air flow passageways opening axially through the corresponding sealing surface means, said first and second air flow passageways providing for air flow across said facially engaging first and second sealing surface means, said first air flow passageway extending through said annular seal member means and opening in said chamber means, means including passageway means in said first annular sleeve means for connecting said chamber means and said first air flow passageways to said source of air, and means including passageway means in said second annular sleeve for connecting said second air flow passageways to said tire.

12. A wheel seal assembly according to claim 11, wherein said means biasing said annular member means toward said second sleeve includes spring means in said chamber means behind said annular seal member means.

13. A wheel seal assembly according to claim 11, wherein said chamber means in said outer end of said first sleeve means supports said annular seal means for tilting displacement relative to said axis to maintain said first and second annular planar sealing surface means in co-planar facial engagement.

14. A wheel seal assembly according to claim 11, wherein said axially outer end of said first sleeve means and said axially inner end of said second sleeve means are in axially overlapping relationship radially outwardly of said first and second annular planar sealing surface means to circumferentially cover said first and second annular sealing surface means.

15. A wheel seal assembly according to claim 11, wherein said annular sealing member means and said inner end of said second sleeve means each include an annular recess in the corresponding sealing surface means, said annular recesses being in axially opposed alignment, and said first and second air flow passageways opening into the corresponding one of said recesses.

16. A wheel seal assembly according to claim 15, wherein said chamber means supports said annular sealing member means for tilting displacement relative to said axis to maintain said first and second annular planar sealing surface means in co-planar facial engagement.

17. A wheel seal assembly according to claim 16, wherein said annular seal member means has an inner end in said chamber means, and the annular recess in said first sealing surface means has a bottom wall, said inner end having an area greater than the area of said bottom wall.

18. A wheel seal assembly according to claim 17, wherein said means biasing said annular member means toward said second sleeve includes spring means in said chamber means behind said annular seal member means.

19. A wheel seal assembly according to claim 18, wherein said spring means includes an apertured annular sheet metal spring washer.

20. A wheel seal assembly according to claim 19, wherein said axially outer end of said first annular sleeve means includes axially extending annular skirt means radially outwardly of said first and second annular planar sealing surface means and extending in overlapping relationship with said axially inner end of said second annular sleeve means.

21. A wheel seal assembly according to claim 20, and annular sealing ring means radially interposed between said skirt means and said axially inner end of said second sleeve means.

22. A wheel seal assembly according to claim 1 wherein said means supporting said wheel means on said wheel support means includes a bearing assembly, said bearing assembly including a rotating bearing race means rotatable about said axis, said means supporting said second annular seal means including means formed integrally with said rotating bearing race means.

23. A wheel seal assembly according to claim 1 wherein said means supporting said wheel means on said wheel support means includes a bearing assembly, said bearing assembly including non-rotating bearing race means mounted on said wheel support means, said means supporting said first annular seal means including means formed integrally with said non-rotating bearing race means.

24. A wheel seal assembly according to claim 22 wherein said bearing assembly includes non-rotating bearing race means mounted on said wheel support means, said means supporting said first annular seal means including means forced integrally with said non-rotating bearing race means.

25. A wheel seal assembly according to claim 1 wherein said second annular seal means has lubricant flow passageway means opening axially through said second annular sealing surface means, for communicating said second annular sealing surface means with a source of lubricant.

26. A wheel seal assembly according to claim 25 wherein said second annular seal means comprises a radially inner and a radially outer surface, and said lubricant flow passageway means is adapted to open to said radially inner surface.

27. A wheel seal assembly according to claim 25 wherein said means supporting said wheel means on said wheel support means includes a bearing assembly supporting said wheel means and wheel support means in radially spaced relationship, said lubricant flow passageway means communicating said second annular sealing surface means with the space between said wheel means and said wheel support means.

28. A wheel seal assembly according to claim 1 wherein said wheel support means includes an annular first outer surface spaced radially outwardly of said first annular seal means, said second annular seal means has an annular second surface spaced radially outwardly of said second annular sealing surface means and axially opposed to said annular first outer surface, and a dust seal means fixed to one of said annular first and second outer surfaces and extending axially into engagement with the other of said annular first and second surfaces.

29. A wheel seal assembly according to claim 28 wherein said dust seal means is an annular fibrous wiper ring.

30. A wheel seal assembly according to claim 11 wherein said means supporting said wheel means on said wheel support means includes a bearing assembly, said bearing assembly including rotating bearing race means rotatable about said axis, said second annular sleeve means being forced integrally with said rotating bearing race means.

31. A wheel seal assembly according to claim 11 wherein said means supporting said wheel means on said wheel support means includes a bearing assembly, said bearing assembly including non-rotating bearing race means mounted on said wheel support means, said first annular sleeve means being formed integrally with said non-rotating bearing race means.

32. A wheel seal assembly according to claim 30 wherein said bearing assembly includes non-rotating bearing race means mounted on said wheel support means, said first annular sleeve means being formed integrally with said nonrotating bearing race means.

33. A wheel seal assembly according to claim 11 wherein said second annular sleeve means has lubricant flow passageway means opening axially through said second annular planar sealing surface means for communicating said second sealing surface means with a source of lubricant.

34. A wheel seal assembly according to claim 33 wherein said second annular sleeve means comprises a radially inner and a radially outer surface, and said lubricant flow passageway means is open to said radially inner surface.

35. A wheel seal assembly according to claim 33 wherein said means supporting said wheel means on said wheel support means includes a bearing assembly supporting said wheel means and wheel support means in radially spaced relationship, said lubricant flow passageway means communicating said second annular planar sealing surface means with the space between said wheel means and wheel support means.

36. A wheel seal assembly according to claim 11 wherein said first annular sleeve means includes an annular first outer surface spaced radially outwardly of said first annular planar sealing surface, said second annular sleeve means has an annular second surface spaced radially outwardly of said second annular planar sealing surface means and axially opposed to said annular first outer surface, and annular dust seal means fixed to one of said annular first and second outer surfaces and extending axially into engagement with the other of said annular first and second surfaces.

37. A wheel seal assembly according to claim 36 wherein said dust seal means is a fibrous wiper ring.

38. A wheel seal assembly for a vehicle having an onboard system for controlling a flow of air through passageway means extending between a tire mounted on a wheel component rotatable about the axis of a non-rotating axle component, said vehicle including bearing means supporting said wheel component on said axle component for rotation about said axis, said bearing means including non-rotating race means mounted on said axle component and rotatable race means supporting said wheel component, said wheel seal assembly comprising:
first sealing means comprising a non-rotating first annular sealing surface transverse to and coaxial with said axis;
second sealing means comprising a rotatable second annular sealing surface transverse to and coaxial with said axis and facially engaging said first sealing surface;
said second sealing means being integral with said rotatable bearing race means;
biasing means for biasing said first and second annular sealing surfaces into engagement to provide an annular sealing interface therebetween; and
said air flow passageway means extending through said first and second annular sealing surfaces and across said interface.

39. A wheel seal assembly according to claim 38 wherein said second annular sealing surface is supported by said rotatable bearing race means.

40. A wheel seal assembly according to claim 38 wherein said first sealing means includes non-rotating annular mounting means formed integrally with said non-rotating bearing race means, and an axially displaceable non-rotating first annular seal member supported on said non-rotating annular mounting means and provided with said first annular sealing surface.

41. A wheel seal assembly according to claim 40 wherein said second annular sealing surface is supported by said rotatable bearing race means.

42. A wheel seal assembly according to claim 38 further including lubricant flow passageway means opening on said sealing interface for communicating said interface with a source of lubricant.

43. A wheel seal assembly according to claim 42 wherein said bearing means supports said wheel component and axle component in radially spaced relationship, said lubricant flow passageway means communicating said sealing interface with a space between said wheel component and axle component.

44. A wheel seal assembly according to claim 43 wherein said second annular sealing surface is supported by said rotatable bearing race means.

45. A wheel seal assembly as defined in claim 38 wherein said first sealing means includes a first radially outer surface surrounding said first annular sealing surface, said second seal means includes a second radially outer surface surrounding said second annular sealing surface and axially spaced from said first radially outer surface, and an annular dust seal fixed to one of said first and second radially outer surfaces and extending axially into facial engagement with the other of said first and second radially outer surfaces.

46. A wheel seal assembly as defined in claim 45 wherein said dust seal is a fibrous wiper ring.

* * * * *